US010445421B2

(12) United States Patent
Villani

(10) Patent No.: US 10,445,421 B2
(45) Date of Patent: *Oct. 15, 2019

(54) OPTIMIZING RENDERING OF DATA TABLES

(71) Applicant: INTERNATIONAL BUSINESS MACHINES CORPORATION, Armonk, NY (US)

(72) Inventor: Massimo Villani, Rome (IT)

(73) Assignee: International Business Machines Corporation, Armonk, NY (US)

( * ) Notice: Subject to any disclaimer, the term of this patent is extended or adjusted under 35 U.S.C. 154(b) by 665 days.

This patent is subject to a terminal disclaimer.

(21) Appl. No.: 13/772,512

(22) Filed: Feb. 21, 2013

(65) Prior Publication Data

US 2014/0237343 A1 Aug. 21, 2014

(51) Int. Cl.
*G06F 3/00* (2006.01)
*G06F 17/24* (2006.01)
*G06F 17/21* (2006.01)

(52) U.S. Cl.
CPC .......... *G06F 17/245* (2013.01); *G06F 17/211* (2013.01)

(58) Field of Classification Search
CPC .... G06F 17/245; G06F 17/211; G06F 17/246; G06F 9/4443; G06F 17/24; G06F 17/30905; G06F 17/30306; G06F 3/0481
See application file for complete search history.

(56) References Cited

U.S. PATENT DOCUMENTS

| 5,588,099 | A | 12/1996 | Magilevsky et al. |
| 5,808,914 | A | 9/1998 | Shin et al. |
| 6,639,611 | B1 | 10/2003 | Leduc |
| 7,725,815 | B2 | 5/2010 | Fujisawa |
| 7,930,323 | B2 | 4/2011 | Brookler et al. |
| 2002/0069226 | A1 | 6/2002 | Thierschmidt |
| 2006/0067654 | A1 | 3/2006 | Herberger et al. |
| 2006/0117253 | A1* | 6/2006 | Polash .......... 715/517 |

(Continued)

OTHER PUBLICATIONS

Lo, et al., Tab Sum: A Flexible and Dynamic table Summarization Approach, 20th International Conference Distributed Computing Systems, 2000 Proceedings, pp. 628.

(Continued)

*Primary Examiner* — Kyle R Stork
(74) *Attorney, Agent, or Firm* — Daniel R. Simek

(57) ABSTRACT

A system and computer program product for determining optimal column widths used in the rendering of data tables displayed in a graphical user interface. The system includes a processor executing instructions to receive a table parameter associated with the contents of the table and determine if the table parameter has changed. If the table parameter has changed, statistical values are calculated for visible columns of the table. A user choice for a run time column width and a default column width are received for each of the columns. A readability index for data displayed in the visible columns is calculated. A maximum readability index for visible columns is calculated. The optimal column widths based on the maximum readability index are determined. The column widths are set to the optimal column widths. The optimal column widths are stored as meta-data. The table of data is displayed using the optimal column widths.

13 Claims, 6 Drawing Sheets

(56) References Cited

U.S. PATENT DOCUMENTS

2009/0083614 A1    3/2009   Wedekind
2009/0259931 A1   10/2009   Peters
2011/0107196 A1    5/2011   Foster

OTHER PUBLICATIONS

Watters et al., "Using Large Tables on Small Display Devices," International Journal of Human-Computer Studies, vol. 58, Issue 1, Jan. 2003.

* cited by examiner

*FIG. 3A*

| Date 302 | Part Number 304 | Description 306 | Quantity 308 | Price 310 |
|---|---|---|---|---|
| 08/17/2008 | 85415 | Camshaft | 1 | 218.36 |
| 02/23/2004 | 23580 | Piston Ring | 5 | 3.85 |
| 05/07/2007 | 19852 | Crank Arm | 3 | 12.25 |
| 12/13/2008 | 14582 | Upper Pulley Retainer | 2 | 7.66 |
| 06/01/2010 | 73258 | Coil Spring Assembly | 7 | 18.14 |
| 08/10/2011 | 54176 | Control Rod | 0 | 26.44 |
| 10/11/2009 | 65910 | Engine Centrifugal Clutch ## | 4 | 365.50 |

FIG. 3B

| Date 302 | Part Number 304 | Description 306 | Quantity 308 | Price 310 |
|---|---|---|---|---|
| 08/17/2008 | 85415 | Camshaft | 1 | 218.36 |
| 02/23/2004 | 23580 | Piston Ring | 5 | 3.85 |
| 05/07/2007 | 19852 | Crank Arm | 3 | 12.25 |
| 12/13/2008 | 14582 | Upper Pulley Retainer | 2 | 7.66 |
| 06/01/2010 | 73258 | Coil Spring Assembly | 7 | 18.14 |
| 08/10/2011 | 54176 | Control Rod | 0 | 26.44 |
| 10/11/2009 | 65910 | Engine Centrifugal Clutch Assembly | 4 | 365.50 |

OPTIMIZING RENDERING OF DATA TABLES

BACKGROUND

1. Technical Field

The present invention generally relates to computer systems. More specifically, the present invention relates to a method and system for determining optimal column widths used in the rendering of data tables displayed in a graphical user interface.

2. Description of the Related Art

Computer systems display data to a user on a display or monitor in a visual format. The visual rendering of data from a database is typically displayed on the display or monitor in a window or table format. A graphical user interface (GUI) is used to present the data and information to a user in a format that is readily comprehended. The table can include an array of cells arranged in rows and columns. The graphical user interface allows the application to display information in the cells. The number of characters contained in the fields or field length displayed in cells can vary widely depending upon the data contained in the database. For example, some fields can have a short field length containing few characters and other fields can have a long field length with long sequences of characters.

In some applications, the user is allowed to choose or select display preferences within the graphical user interface. For example, the user may be allowed to use an input device such as a mouse to selectively change the number of columns displayed, the height of a row or the width of a column. Unfortunately, it is difficult to determine the height of a row or the width of a column to be displayed because of the variable field length. If the longest field length is used to determine the column width, the resulting column width in the table may be over sized resulting in excessive empty spaces. If the shortest field length is used to determine the column width, the resulting column width in the table may be too small resulting in cells with a truncated set of characters displayed. An improved method of determining column widths in a table is needed.

BRIEF SUMMARY

Disclosed are a method, a data processing system and a computer program product for determining optimal column widths used in the rendering of data tables displayed in a graphical user interface.

The method includes receiving at least one table parameter associated with the contents of the table; determining if the at least one table parameter has changed; in response to the at least one table parameter changing, calculating based on the table parameter, two or more statistical values for visible columns of the table; receiving a user choice for a run time column width and a default column width associated with a column width for each of the columns in the table; calculating at least one readability index for data displayed in the visible columns using at least one of a data type, the statistical values, the run time column width and the default column width; calculating a maximum readability index for visible columns; determining based on the maximum readability index, one or more optimal column widths for display of the data; setting the column widths for the visible columns to the optimal column widths; storing the optimal column widths as meta-data; and displaying the table of data using the optimal column widths.

The data processing system includes at least one memory; one or more processors in communication with the memory, the processors operable to execute instructions which cause the processor to: receive at least one table parameter associated with the contents of the table; determine if the at least one table parameter has changed; in response to the at least one table parameter changing, calculate based on the table parameter, two or more statistical values for visible columns of the table; receive a user choice for a run time column width and a default column width associated with a column width for each of the columns in the table; calculate at least one readability index for data displayed in the visible columns using at least one of a data type, the statistical values, the run time column width and the default column width; calculate a maximum readability index for visible columns; determine based on the maximum readability index, one or more optimal column widths for display of the data; set the column widths for the visible columns to the optimal column widths; store the optimal column widths as meta-data; and display the table of data using the optimal column widths.

The computer program product includes a computer readable storage device; and program code on the computer readable storage device that when executed within a data processing device, the program code provides the functionality of: receiving at least one table parameter associated with the contents of the table; determining if the at least one table parameter has changed; in response to the at least one table parameter changing, calculating based on the table parameter, two or more statistical values for visible columns of the table; receiving a user choice for a run time column width and a default column width associated with a column width for each of the columns in the table; calculating at least one readability index for data displayed in the visible columns using at least one of a data type, the statistical values, the run time column width and the default column width; calculating a maximum readability index for visible columns; determining based on the maximum readability index, one or more optimal column widths for display of the data; setting the column widths for the visible columns to the optimal column widths; storing the optimal column widths as meta-data; and displaying the table of data using the optimal column widths.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein:

FIG. 3A illustrates an example of a displayed data table, in accordance with one or more embodiments;

FIG. 3B illustrates an example of a displayed data table with optimal column widths, in accordance with one or more embodiments;

DETAILED DESCRIPTION

The illustrative embodiments provide a method, system and computer program product for determining optimal column widths used in the rendering of data tables displayed in a graphical user interface. The method includes receiving a table parameter associated with the contents of the table and determining if the table parameter has changed. If the table parameter has changed, statistical values are calculated for visible columns of the table. A user choice for a run time column width and a default column width are received for each of the columns. A readability index for data displayed in the visible columns is calculated. A maximum readability index for visible columns is calculated. The optimal column widths based on the maximum readability index are determined. The column widths are set to the optimal column widths. The optimal column widths are stored as meta-data. The table of data is displayed using the optimal column widths.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
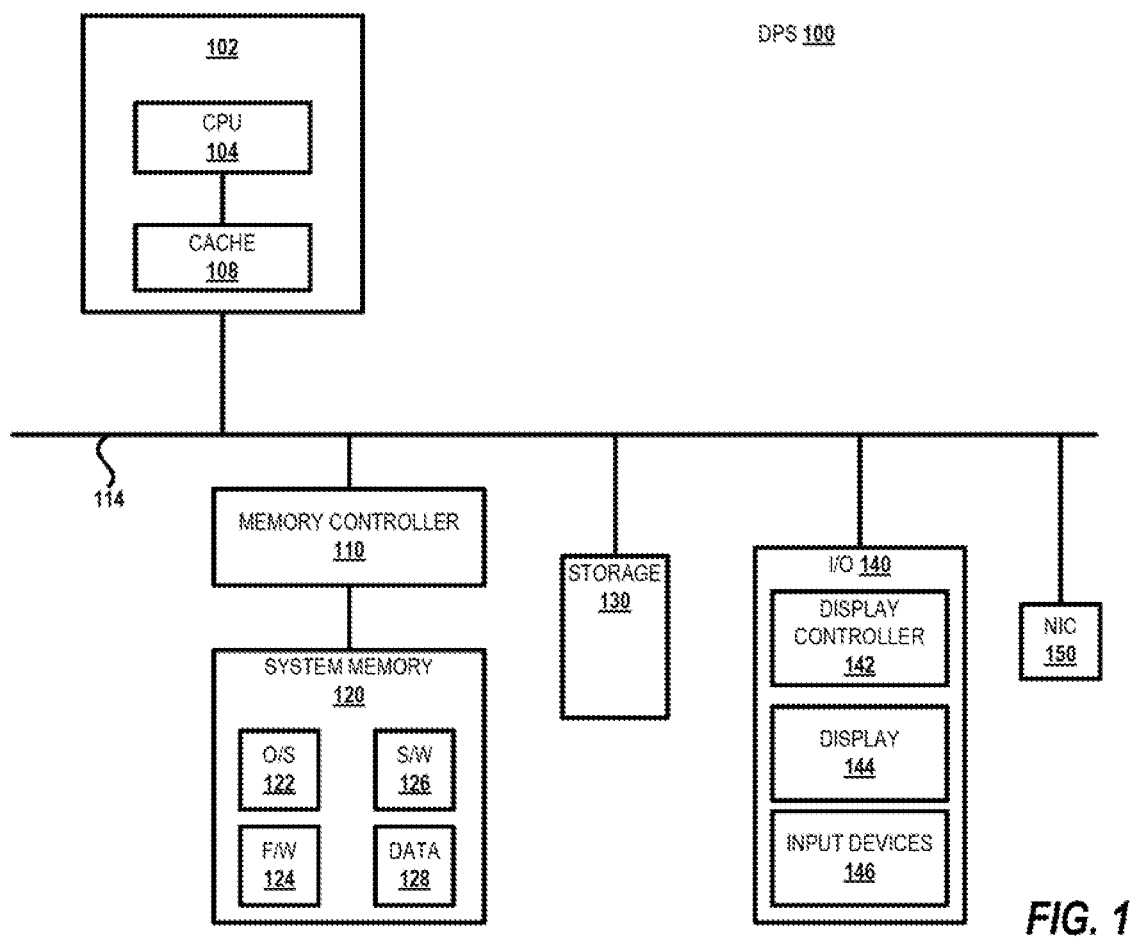
FIG. 1 provides a block diagram representation of an example data processing system within which one or more of the described embodiments can be practiced.

With reference now to the figures, and beginning with FIG. 1, there is depicted a block diagram representation of an example data processing system (DPS), as utilized within one embodiment. The data processing system can be described as having features common to a server computer. However, as used herein, the term "data processing system," is intended to include any type of computing device or machine that is capable of receiving, storing and running a software product and retrieving data/instructions from a storage device. Therefore the DPS can include not only computer systems, but also devices such as communication devices (e.g., routers, switches, pagers, telephones, electronic books, electronic magazines and newspapers, etc.) and personal and home consumer devices (e.g., handheld computers, Web-enabled televisions, home automation systems, multimedia viewing systems, etc.).

FIG. 1 and the following discussion are intended to provide a brief, general description of an exemplary data processing system adapted to implement the described embodiments. While embodiments will be described in the general context of instructions residing on hardware within a server computer, those skilled in the art will recognize that embodiments may be implemented in a combination of program modules running in an operating system. Generally, program modules include routines, programs, components, and data structures, which perform particular tasks or implement particular abstract data types. The invention may also be practiced in distributed computing environments where tasks are performed by remote processing devices that are linked through a communications network. In a distributed computing environment, program modules may be located in both local and remote memory storage devices.

FIG. 1 illustrates an example DPS 100 that comprises one or more processor modules or chips 102 that include one or more central processing units (CPU), of which CPU 104 is illustrated. Throughout the description herein, the terms CPU and processor can be utilized interchangeably as referring to the same component. Processor chip 102 further includes a cache subsystem 108. Cache subsystem 108 can comprise one or more levels of caches, such as an L1 cache and an L2 cache, and one or more of the lower levels of caches can be a shared cache. Processor chip 102 is coupled to a system interconnect fabric 114 that couples other components of DPS 100 to processor chip 102. Interconnect fabric 114 in an embodiment can be an address and data bus.

System memory 120 is coupled to system interconnect fabric 114 via a memory controller 110. System memory 120 can include therein a plurality of modules and routines, including operating system (O/S) 122, firmware (F/W) 124, software (S/W) 126, and data 128. The various software and/or firmware modules have varying functionality when their corresponding program code is executed by CPU 104 within DPS 100.

DPS 100 can further include physical computer readable storage media 130 (or storage) such as hard disk drives. Storage media 130 can also include solid state storage devices, optical drives and other storage devices. DPS 100 can also include input/output devices and corresponding controllers, generally represented as I/O 140, and a network interface card (NIC) 150, among other components. NIC 150 enables DPS 100 to connect to and communicate with other remote devices and networks. I/O 140 can include a display controller 142 that is in communication with one or more display(s) 144. Display controller 142 is a graphics or video controller that can control at least a portion of the content shown on display(s) 144. I/O 140 can further include input devices 146 such as a keyboard or mouse that allow a user to make selections and provide input to DPS 100.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The example data processing systems depicted in FIG. 1 may be, for example, an IBM eServer pSeries system, a product of International Business Machines Corporation in Armonk, N.Y., running the Advanced Interactive Executive (AIX) operating system (Trademark of IBM Corporation) or LINUX operating system (Trademark of Linus Torvalds).

Figure 2:
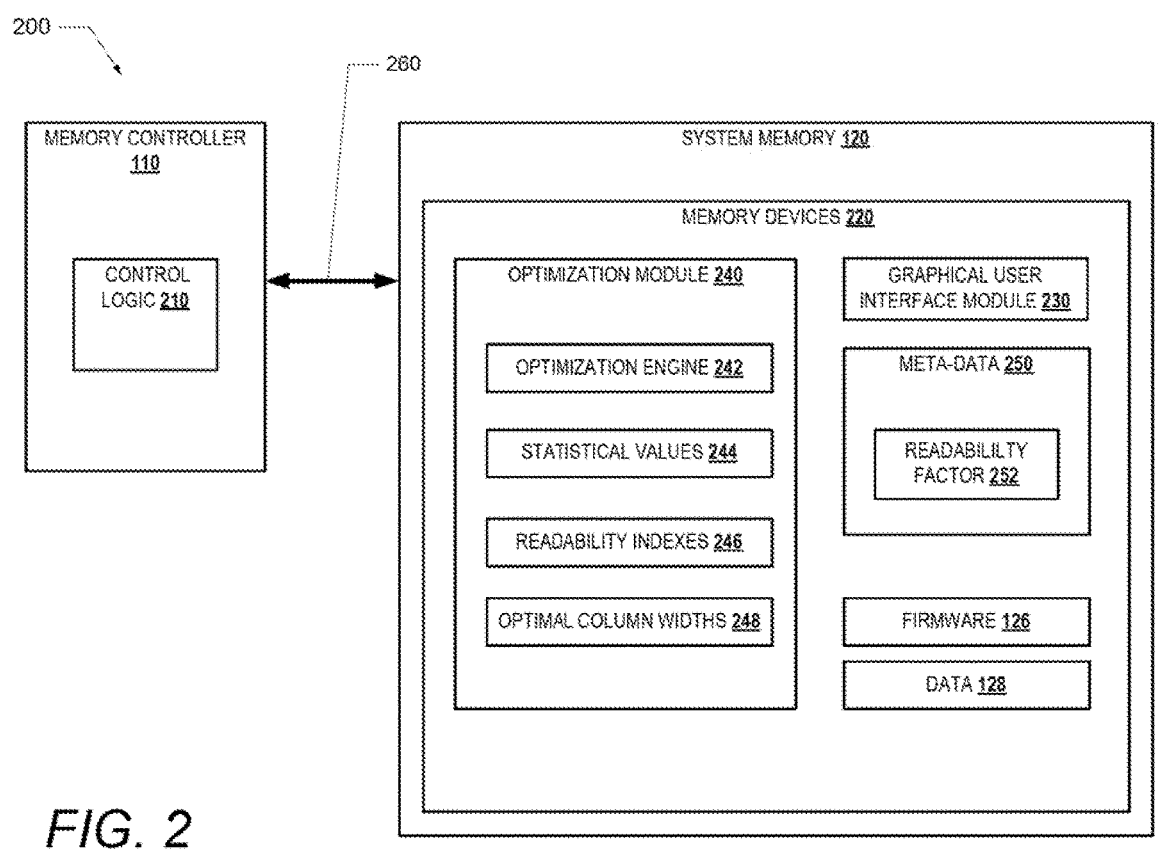
FIG. 2 illustrates a block diagram of an example memory system, in accordance with one or more embodiments.

With reference now to FIG. 2, there is illustrated one embodiment of memory subsystem 200. In the discussion of FIG. 2, reference is also made to elements described in FIG. 1. Memory subsystem 200 includes memory controller 110 and system memory 120. System memory 120 comprises one or more memory chips or devices 220 that can be accessed by memory controller 110 via a memory address and data bus 260. Memory devices 220 can include DRAM devices or non-volatile memory devices such as NAND flash devices. Operating system (O/S) 122, firmware (F/W) 124 (FIG. 1), software (S/W) 126 and data 128 can be stored in and retrieved from system memory 120 through the operation of read and write commands.

Memory controller 110 comprises control logic 210 necessary for reading and writing to memory devices 220. Each of the memory controller components can communicate with each other via a communication fabric, which includes specific messaging signals communicated over specific signal lines (not illustrated).

Functions, modules, routines, methods and processes of the present disclosure can be provided as firmware code and/or logic stored on system memory 120 and executed on processor 102. System memory 120 includes graphical user interface module 230, optimization module 240, meta-data 250, firmware 126, and data 128. The firmware code and logic can implement a graphical user interface module 230 and optimization module 240. Graphical user interface module 230 is executed by processor 102 to transform text or machine output from processor 102 into images or visual elements presented on display 144. Graphical user interface module 230 also renders data to be displayed in a table format. The rendering can include determining the overall size of the table displayed as well as column widths and heights. Graphical user interface module 230 also transforms input provided to display 144 into text or machine input to processor 102.

Optimization module 240 comprises an optimization engine 242, statistical values 244, readability indexes 246, and optimal column widths 248. Optimization module 240 uses a linear optimization engine or algorithm 242. Optimization module 240 is executed by processor 102 to determine the optimal formatting and columns widths to be displayed for tables presented on display 144. In one embodiment, optimization engine 242 is a commercially available optimization engine such as the ILOG CPLX optimization engine from International Business Machines Corporation of Armonk, N.Y. Optimization engine 242 receives parameters of the model of the optimization problem including variables and constraints as inputs and runs to obtain a solution to the problem as an output. Optimization engine 242 can execute on CPU 104. Meta-data 250 contains data or information about the formatting of tables shown on display 144 such as column widths. Meta-data 250 also contains readability factor 252. Data 128 can include information to be displayed in a table format.

Those of ordinary skill in the art will appreciate that the hardware components and basic configuration depicted in FIGS. 1 and 2 and described herein may vary. For example, the illustrative components within DPS 100 are not intended to be exhaustive, but rather are representative to highlight components that can be utilized to implement aspects of the present disclosure. For example, other devices/components may be used in addition to or in place of the hardware depicted. The depicted examples do not convey or imply any architectural or other limitations with respect to the presently described embodiments and/or the general disclosure.

FIGS. 3A and 3B illustrate examples of rendered data tables 300, 395 displayed in a graphical user interface 380 that can be shown on display 144. In the discussion of FIGS. 3A and 3B reference is also made to elements described in FIG. 1 and FIG. 2. FIG. 3A comprises a data table 300 that includes an array 360 of cells 362 arranged in rows 364 and columns 366. Data 128 can be shown in cells 362. Data table 300 illustrates portions of a parts catalog. Data table 300 includes several columns 366 with column headers 368 including columns date 302, part number 304, description 306, quantity 308 and price 310. In FIG. 3A, columns 302-310 are shown as being visible on display 144. Table 300 can further include columns (not shown) that are not displayed on display 144, but that can be shown by a user manually scrolling across the table.

Data table 300 has several table parameters 320 including a total width TW 340, a total height TH 350 and an individual row height RH 345. Each column of data table 300 has an associated default column width. Table parameters 320 further include a date column 302 with a width W1 322, part number column 304 has a width W2 324, description column 306 has a width W3 326, quantity column 308 has a width W4 328 and price column 310 has a width W5 330. The default column widths 322-330 are the column widths that are either initially displayed or that are used in the absence of any user input to select the column widths.

Within each cell 362, a field 370 of characters such as text or numbers can be displayed. Each field 370 has an associated field length 372. In one embodiment, the field length 372 of characters is less than the column width such that all of characters are visible within the column. In another embodiment, the field length 372 of characters is greater than the column width such that the characters are truncated and only part of the characters is shown. Table parameters 320 also include field 370 and field length 372.

The last row of description column 306 illustrates an example where the field length 372 of characters is greater than the column width W3 326. In the last row of column 306, the words after "clutch" have been truncated by the use of the "##" symbol to indicate that additional words or characters have been truncated or omitted. The column width W3 326 is insufficient to display all of the characters in the field 370. A user can selectively adjust the widths of any of columns 302-310 within table 300 using an input device 146 such as a mouse in conjunction with display 144. A user can increase or decrease the width W3 326 of column 306 using input device 146 by clicking and dragging the vertical line separating column 306 from column 308. In FIG. 3, a run time column width 390 for column 306 is illustrated as selectively chosen by a user to increase the width of column 306.

FIG. 3B is similar to FIG. 3A, except that data table 395 contains column widths 322-330 that have been changed or resized so as to display all of the characters in the longest or maximum field length 372. In the last row of column 306, the column width is now set such that all of the characters in the field 370, "Engine Centrifugal Clutch Assembly" are now displayed without any characters being truncated or omitted. The column width W3 326 is now sufficient to display all of the characters corresponding to the maximum field length 372.

Figure 4:
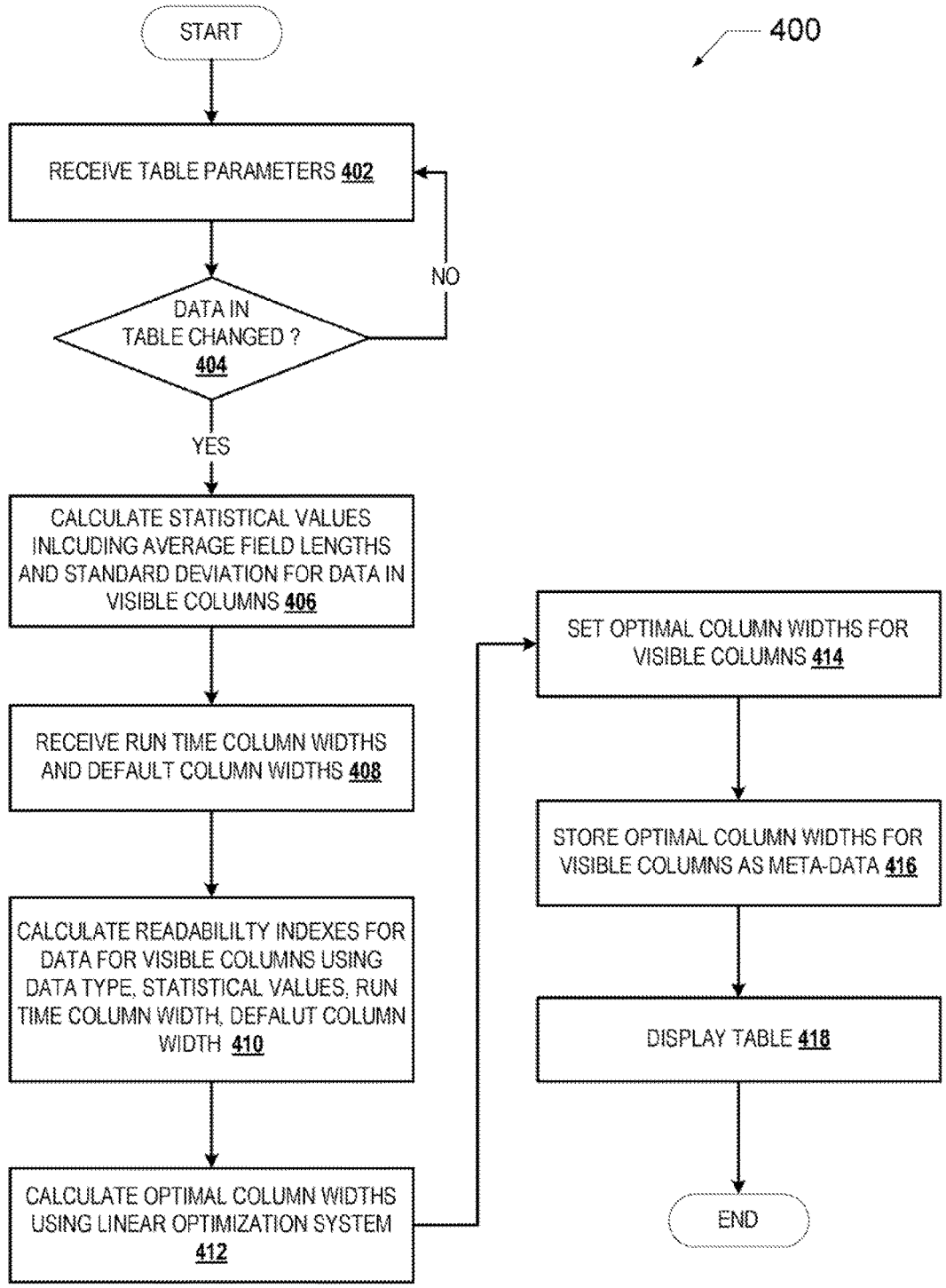
FIG. 4 is a flow chart illustrating one example of a method of determining optimal column widths for a table of data, according to one or more embodiments.

FIG. 4 illustrates a flowchart of an exemplary process for determining optimal column widths for a table of data. Computer implemented method 400 can be implemented in DPS 100. The description of the method is provided with general reference to the specific components illustrated within the preceding figures. In the discussion of FIG. 4, reference is also made to elements described in FIGS. 1-3B. Generally the method is described as being implemented via CPU 104 and particularly the execution of code provided by firmware 124 and software 126 acting within graphical user interface module 230 and optimization module 240 and operable on CPU 104. Graphical user interface module 230 and optimization module 240 are executed by CPU 104. It is however appreciated that certain aspects of the described methods may be implemented via other processing devices and/or execution of other code.

Method 400 begins at the start block and proceeds to block 402 where CPU 104 receives table parameters 320. Table parameters 320 include a type of data and field lengths 372 for each column in table 300. CPU 104 determines if the data in the table has changed (404) including determining if the content of fields 370 or field lengths 372 have changed. In response to the data in the table not being changed, method 400 returns to block 402 to continue receiving table parameters. In response to the data in the table changing, CPU 104 calculates the statistical values 244 including average field lengths and standard deviations of the field lengths for visible columns (406). The average field lengths and standard deviations of the field lengths for visible columns are calculated based on the received table parameters. At block 408, CPU 104 receives at least one of a user choice for run time column widths and/or default column widths for each of the columns in table 300. A user can selectively choose the width of any of columns 302-310 within table 300 using input device 146. In one embodiment, the default column width can be the column width most frequently selected by users. The run time column width has precedence over the default column width.

CPU 104 calculates the best or maximum and worst readability indices 246 for data displayed in the visible columns 302-310 using at least one of a data type, the statistical values 244, the run time column width 390, and the default column width 326 (410).

For a given column, the worst readability index for data with a variable field length is the minimum field length selected from the actual field lengths 372 for fields 370 of data in the respective column, and the best or maximum readability index is the maximum field length selected from the actual field lengths 372 for fields 370 of data in that column. For columns with fixed length data or with variable length data but with standard deviation of the lengths below a minimum threshold (this is a fixed parameter of the system) the best readability index is set equal to the maximum field length and the worst readability index is set to the column default width. If the column width is set to the maximum readability index, the user will be able to view, for each row 364, all of the characters contained in the field 370 without any characters being cut by column separator 332.

The best and worst readability indexes 246 are calculated based on a linear combination of the data type, the statistical values, the run time column width and the default column width. In one embodiment, the data type can be a SQL data type of the data to be displayed. The statistical values are the average field lengths and standard deviations of the field lengths for visible columns.

The readability index 246 calculation for variable field length data starts with analysis of the column data to be displayed in the data table 300. The data table 300 contains several columns 302-310 of different data types. The data types can include, for example, strings of characters (VARCHAR, CHAR, types in SQL notation), numbers (INTEGER, DECIMAL in SQL notation), date, and timestamp. Each of the respective columns 302-310 has an associated data type and maximum field length 372. One or more of the columns 302-310 can have either a fixed field length or a variable field length 372 starting from an actual minimum field length to an actual maximum field length. The field lengths 372 can change as new data is added or data is removed from data table 300. The maximum field length is typically less than or equal to the field length associated with the column of data on the schema of the database where the table containing that column is defined. The readability index calculation depends on the data type to be displayed. For every data type with variable field lengths 372:

(a) For each row 364 to be displayed, the actual length of the string of characters is analyzed statistically to compute the distribution function of the lengths (DFL) that include the average field lengths and the standard deviation of the field lengths for visible columns. In one embodiment, for example, the DFL can have a Gaussian distribution with an average length equal to 10 characters and a standard deviation equal to 3 characters;

(b) A readability factor (RF) 252, such as number from 0 to 1, is selected by the user or is pre-defined and stored to system memory 120. The readability factor 252 can be stored as part of metadata 250;

(c) The computation of the readability indexes 246 takes the distribution function DFL and the readability factor (RF) as inputs.

The best or maximum readability index (Ribest) is the length in the distribution of field lengths 372 that allow the user to read on the display no less than RF*100 percent of all the rows entirely without having to manually adjust the column widths 322-330 or move column separators 332. In the example of FIG. 3A, the readability factor 252 is equal to 6/7 because there are six rows that can be read entirely over the seven total rows.

At block 412, an equation system with linear constraints is built where the column widths W1, W2 up to Wn are the unknown widths to be estimated. Equation system A definitions and constraints include:

Wn=Visible width of column n of the table to be displayed by the table drawing component. They represent the variables to be calculated by the optimization engine.

Riworst (Col n)=The worst readability Index (Col n), one for each of the columns 302-310 is an input parameter for the optimization engine.

Ribest (Col n)=The best readability Index (Col n), one for each of the columns 302-310 is an input parameter for the optimization engine.

Ridefaultw (Col n)=The default column width assigned to column n by the table rendering component according to its internal rendering strategy, one for each of the columns 302-310 is an input parameter for the optimization engine.

$$W1+W2+\ldots+Wn<WT$$

WT=Total Width 340 available on the display at the chosen resolution for the entire data table. The total width 340 can change for different user sessions if the space available on the display changes. The total width 340 is a fixed input parameter for the optimization engine 242.

$$Ridefaultw\ (Col\ 1) <= W1 <= Ribest\ (Col\ 1)$$

-continued $$Ride_{faultw} (Col\ 2) <= W2 <= Ri_{best} (Col\ 2)$$
$$...$$
$$up\ to\ Ride_{faultw}(Col\ n) <= Wn <= Ri_{best} (Col\ n)$$

The relaxable constraints that the optimization engine can ignore to find the optimized solution are:

$$Ri_{worst} (Col\ 1) <= W1$$
$$Ri_{worst} (Col\ 2) <= W2$$
$$...$$
$$up\ to\ Ri_{worst}(Col\ n) <= Wn$$

With the above parameters established, Equation A is maximized by optimization engine 242:

Given Ci=1/Riworst $$W1*C1+W2*C2+\ldots+Wn*Cn, \quad \text{Equation A}=$$

where Wi*Ci=the equation contribution from col i

Based on solving equation system A using linear optimization engine 242, CPU 104 determines one or more optimal column widths 248 for display of the data using optimization engine 242 (412) and sets the column widths for the visible columns to the optimal column widths 248 (414).

At block 416, CPU 104 stores the optimal column widths 248 for visible columns as meta-data 250 within system memory 120 and displays the table 300 of data using the optimal column widths (418). Stored meta-data 250 is then available to be used in subsequent displays of the table. Method 400 then ends.

Figure 5:
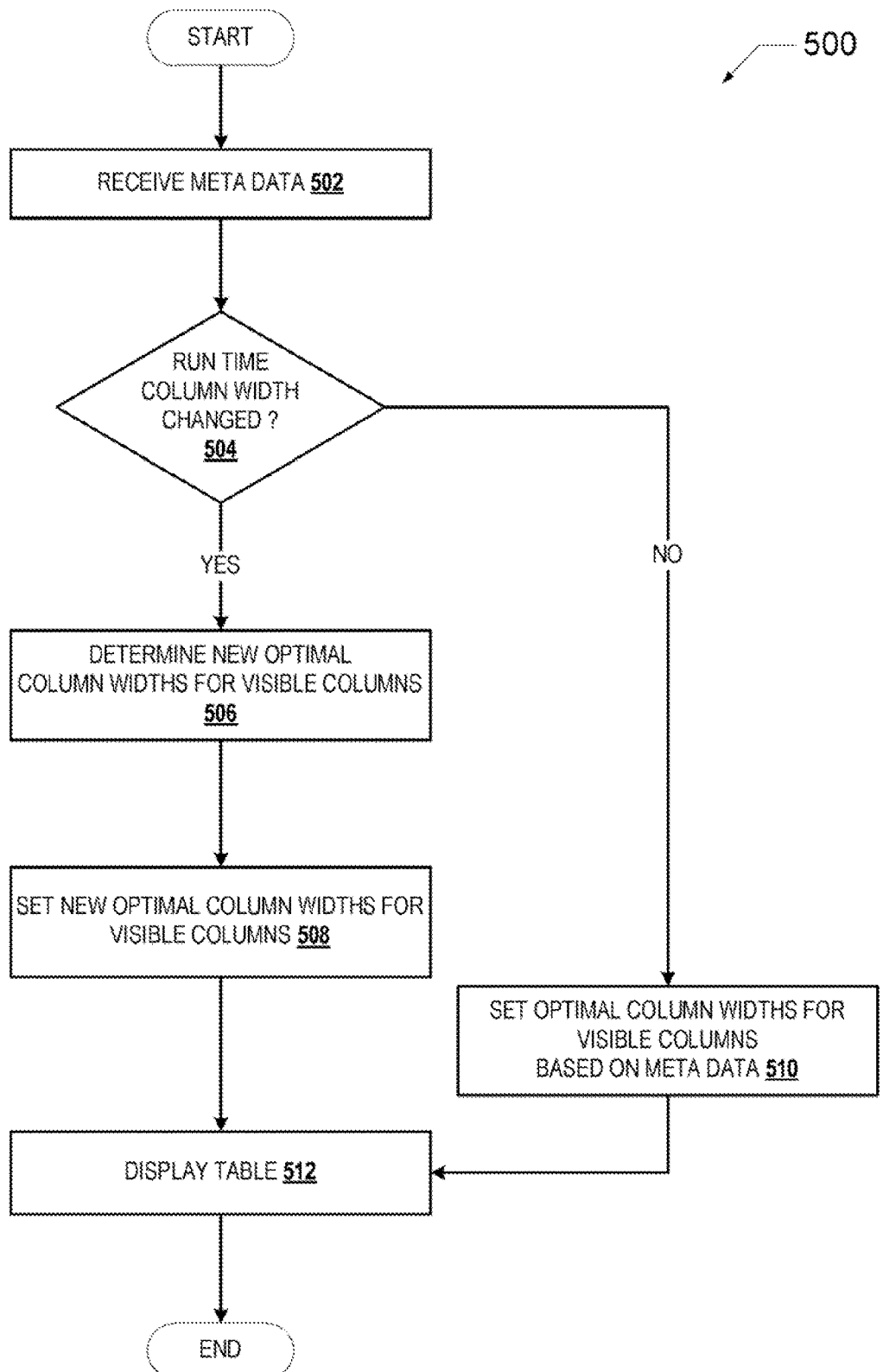
FIG. 5 is a flow chart illustrating one example of another method of determining optimal column widths for a table of data, according to one or more embodiments.

FIG. 5 illustrates a flowchart of an exemplary process for determining optimal column widths 248 for a table of data using meta-data 250. Computer implemented method 500 can be implemented in DPS 100. The description of the method is provided with general reference to the specific components illustrated within the preceding figures. In the discussion of FIG. 4, reference is also made to elements described in FIGS. 1-3B. Generally the method is described as being implemented via CPU 104 and particularly the execution of code provided by firmware 124 and software 126 acting within graphical user interface module 230 and optimization module 240 and operable on CPU 104. Graphical user interface module 230 and optimization module 240 are executed by CPU 104. It is however appreciated that certain aspects of the described methods may be implemented via other processing devices and/or execution of other code.

Method 500 begins at the start block and proceeds to block 502 where CPU 104 receives meta-data 250 stored in system memory 120. CPU 104 determines if any of the run time column widths 390 have been changed (block 504). The run time column widths 390 can be selectively changed by a user viewing table 300 via input device 146. In response to at least one of the run time column widths being changed, CPU 104 determines new optimal column widths 248 for the visible columns whose run time column width have changed based on the new run time column widths (block 506). The optimal column widths for columns where the run time columns widths have not changed are based are the previous column widths contained in meta-data 250. CPU 104 sets the column widths for the visible columns to the new optimal column widths (block 508) and displays the table 300 of data using the new optimal column widths (block 512). Method 500 terminates at the end block.

In response to the run time column widths 390 not being changed at block 504, CPU 104 sets the optimal column widths 248 for the visible columns based on meta-data 250 (block 510). The column widths are set based on the previously determined column widths contained in meta-data 250. CPU 104 displays the table 300 of data using the new optimal column widths (block 512). Method 500 terminates at the end block.

One or more of the described embodiments provide a method for determining optimal column widths used in the rendering of data tables displayed in a graphical user interface. The method includes receiving a table parameter associated with the contents of the table and determining if the table parameter has changed. If the table parameter has changed, statistical values are calculated for visible columns of the table. A user choice for a run time column width and a default column width are received for each of the columns. A readability index for data displayed in the visible columns is calculated. A maximum readability index for visible columns is calculated using a linear optimization system. The optimal column widths based on the maximum readability index are determined. The column widths are set to the optimal column widths. The optimal column widths are stored as meta-data. The table of data is displayed using the optimal column widths.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data processing system comprising:
at least one memory;
a processor in communication with the memory, the processor operable to execute instructions which cause the processor to:
receive at least one table parameter associated with the contents of the table;
determine if the at least one table parameter has changed;
in response to the at least one table parameter changing, calculate based on the table parameter, two or more statistical values for a plurality of visible columns of the table;
receive a user choice for a run time column width and a default column width associated with a column width for each of the columns in the table;
calculate at least one readability index for data displayed in the visible columns using at least one of a data type, the statistical values, the run time column width and the default column width;
calculate a maximum readability index for visible columns, wherein the maximum readability index of a visible column identifies a length within a distribution of field lengths that allows all data in each row of the visible column to be viewed without adjusting a column width of any of the plurality of visible columns;
determine a chosen resolution for a display of the data processing system, wherein the chosen resolution is associated with a current user session of the data processing system;
determine, from the current user session, a total width that specifies an available space for presenting, on the display, an entire table at the chosen resolution;
determine based on the maximum readability index, one or more optimal column widths for display of the data, the optimal column width maximizing a width of the visible column based on the total width and the chosen resolution;
set the column widths for the visible columns to the optimal column widths;
store the optimal column widths as meta-data; and
display the table of data using the optimal column widths.

2. The data processing system of claim 1, further comprising instructions that cause the processor to:
receive the meta-data containing the optimal column widths;
determine if the run time column width has changed;
in response to the run time column width being changed, determine new optimal column widths for display of the data;
set the column widths for visible columns to the new optimal column widths; and
display the table of data using the new optimal column widths.

3. The data processing system of claim 1, further comprising instructions that cause the processor to:
receive the meta-data containing the optimal column widths;
determine if the run time column width has changed;
in response to the run time column width not being changed, set the column widths for visible columns to the optimal column widths; and
display the table of data using the optimal column widths.

4. The data processing system of claim 1, further comprising instructions that cause the processor to:
in response to the at least one table parameter not being changed, continue to receive the at least one table parameter associated with the contents of the table.

5. The data processing system of claim 1, wherein calculating the statistical values further comprises instructions that cause the processor to:
calculate an average column width for visible columns; and
calculate a standard deviation of the column widths for visible columns.

6. The data processing system of claim 1, wherein calculating the at least one reliability index further comprises instructions that cause the processor to:
calculate a worst readability index; and
calculate a best readability index.

7. The data processing system of claim 1, wherein the maximum readability index for visible columns is calculated using a linear optimization system.

8. A computer program product comprising:
a computer readable storage device; and
program code on the computer readable storage device that when executed within a data processing device, the program code provides the functionality of:
receiving at least one table parameter associated with the contents of the table;
determining if the at least one table parameter has changed;
in response to the at least one table parameter changing, calculating based on the table parameter, two or more statistical values for a plurality of visible columns of the table;
receiving a user choice for a run time column width and a default column width associated with a column width for each of the columns in the table;
calculating at least one readability index for data displayed in the visible columns using at least one of a data type, the statistical values, the run time column width and the default column width;
calculating a maximum readability index for visible columns, wherein the maximum readability index of a visible column identifies a length within a distribution of field lengths that allows all data in each row of the visible column to be viewed without adjusting a column width of any of the plurality of visible columns;
determining a chosen resolution for a display of the data processing system, wherein the chosen resolution is associated with a current user session of the data processing system;

determining, from the current user session, a total width that specifies an available space for presenting, on the display, an entire table at the chosen resolution;

determining based on the maximum readability index, one or more optimal column widths for display of the data, the optimal column width maximizing a width of the visible column based on the total width and the chosen resolution;

setting the column widths for the visible columns to the optimal column widths;

storing the optimal column widths as meta-data; and displaying the table of data using the optimal column widths.

9. The computer program product of claim 8, further comprising program code on the computer readable storage device that when executed within the data processing device, the program code provides the functionality of:

receiving the meta-data containing the optimal column widths;

determining if the run time column width has changed;

in response to the run time column width being changed, determining new optimal column widths for display of the data;

setting the column widths for visible columns to the new optimal column widths; and displaying the table of data using the new optimal column widths.

10. The computer program product of claim 8, further comprising program code on the computer readable storage device that when executed within the data processing device, the program code provides the functionality of:

receiving the meta-data containing the optimal column widths;

determining if the run time column width has changed;

in response to the run time column width not being changed, setting the column widths for visible columns to the optimal columns widths; and displaying the table of data using the optimal column widths.

11. The computer program product of claim 8, further comprising program code on the computer readable storage device that when executed within the data processing device, the program code provides the functionality of:

in response to the at least one table parameter not being changed, continuing to receive the at least one table parameter associated with the contents of the table.

12. The computer program product of claim 8, wherein calculating the statistical values further comprises program code on the computer readable storage device that when executed within the data processing device, the program code provides the functionality of:

calculating an average column width for visible columns; and calculating a standard deviation of the column widths for visible columns.

13. The computer program product of claim 8, wherein calculating the at least one readability index further comprises program code on the computer readable storage device that when executed within the data processing device, the program code provides the functionality of:

calculating a worst readability index; and calculating a best readability index.

\* \* \* \* \*